Sept. 22, 1959   L. S. LEE ET AL   2,905,289
TORQUE SENSING BRAKE RELEASE MECHANISM
Filed Feb. 13, 1956   2 Sheets-Sheet 2

INVENTORS
LYMAN S. LEE &
HOWARD L. HAYDEN
BY
ATTORNEY

United States Patent Office
2,905,289
Patented Sept. 22, 1959

2,905,289

TORQUE SENSING BRAKE RELEASE MECHANISM

Lyman S. Lee and Howard L. Hayden, Los Angeles, Calif., assignors to Jack & Heintz, Inc., Cleveland, Ohio, a corporation of Delaware Application February 13, 1956, Serial No. 564,941

7 Claims. (Cl. 192—2)

This invention relates in general to automatic means for controlling and regulating the release and application of braking mechanism upon a motor driven rotary shaft.

In the event that an electric motor is required to drive a variable load up to a predetermined value, and the motor, through some electrical or mechanical failure, is not capable of generating a force equal to that predetermined load value, we have found it preferable to not have the brake released from the motor driven shaft in order to prevent the driven mechanism from moving from its initial braked position.

It is therefore an object of our invention to provide for this safety feature by providing a torque sensing mechanism so designed and constructed as to be capable of releasing the brake from the motor driven shaft only after a predetermined torque has been generated by the motor.

An additional and important object of the invention is to also provide means in the torque sensing brake mechanism whereby after the brake has been released and the motor is driving the load up to such predetermined value, or greater, and the load should subsequently drop below such predetermined value, the brake will remain released so as to allow a variable load to be driven as required.

With the foregoing and other objects in view, the invention resides in the combination of parts and in the details of construction hereinafter set forth in the following specification and appended claims, certain embodiments thereof being illustrated in the accompanying drawings, in which:

Figure 1 is a view, partly in side elevation and partly in longitudinal section, of one form that the invention may take, showing an electric motor and motor shaft, an output shaft and a spring urged sliding coupling between the motor shaft and output shaft including a coupling collar slidable on the output shaft, a braking mechanism including a brake arm longitudinally slidably splined onto the output shaft, spring means shown to be normally applying the braking mechanism to the output shaft, an electromagnetic solenoid brake release mechanism, a micro switch, shown open, and a switch tripping arm adapted to be actuated upon axial movement of the coupling collar for closing the switch to energize the electromagnet to release the braking mechanism;

Figure 1:
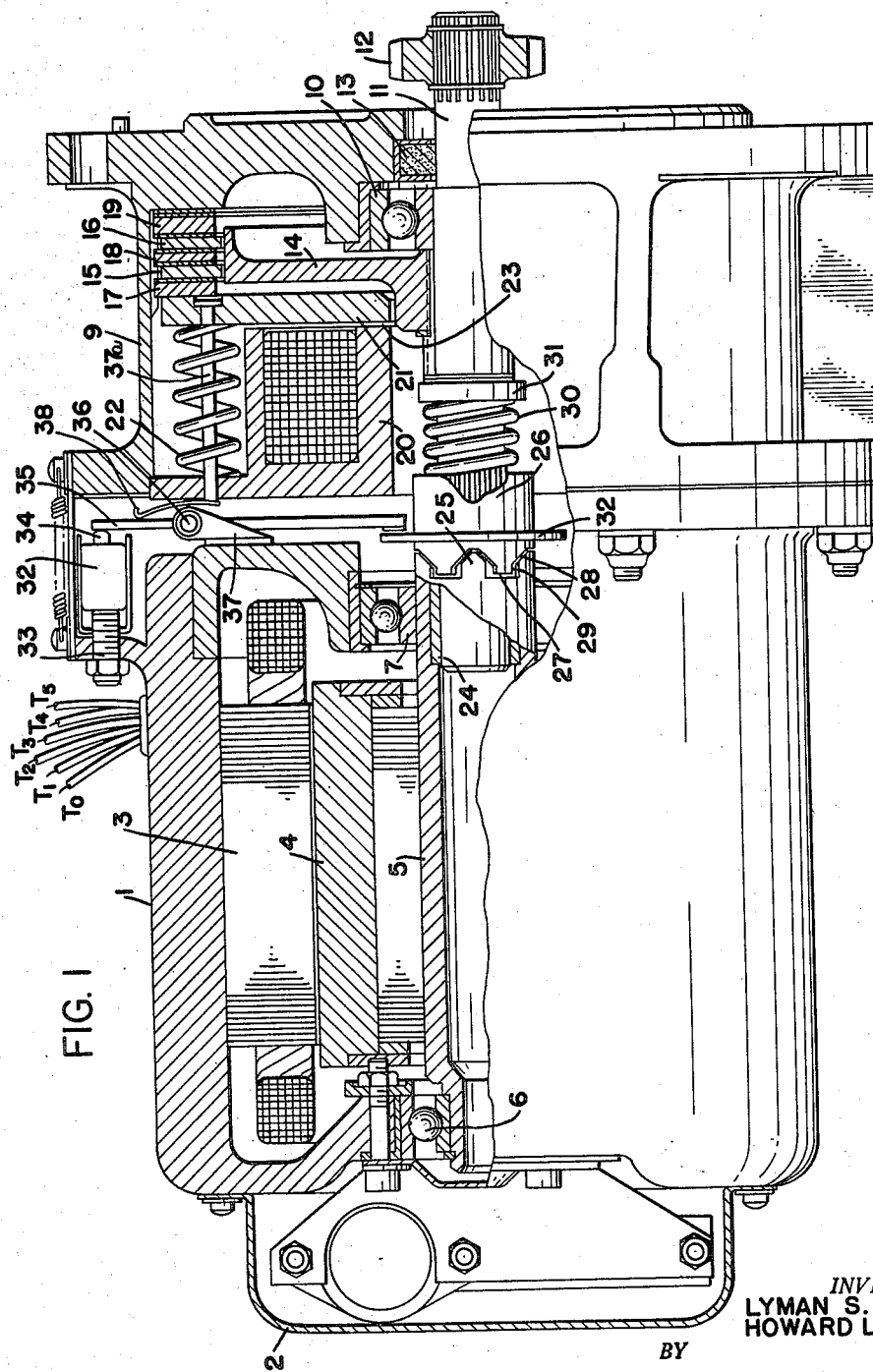

Referring more particularly to the drawings, we have shown in Figure 1 an electric motor having a housing 1, an end cap 2, a stator 3, a rotor 4 and a motor shaft 5 supported in the housing 1 by bearings 6 and 7. Releasably secured to motor housing 1 by bolts 8 is another housing 9 in which is supported by bearing 10 an output shaft 11 shown at its outer end to have splined thereto a gear 12 adapted to be the driving element for a given load. The output shaft 11 is shown as having an oil seal 13.

Splined to output shaft 11 is a brake arm 14, on the outer periphery of which are longitudinally splined two spaced brake discs 15 and 16, as part of the brake assembly. The remainder of the brake assembly includes alternately arranged brake discs 17, 18 and 19 that are longitudinally slidably splined to the inner surface of housing 9.

The brake assembly also includes an electromagnet 20 having an axially movable armature 21 that is shown in Figure 1 to be normally spring pressed by a compression coil spring 22 to compress the brake disc assembly to render it effective to brake the output shaft 11, leaving an axial clearance 23 between the electromagnet 20 and the armature 21, as shown in Figure 1.

The hollow motor shaft 5 has fitted therein a sleeve 24 so as to provide the output end of the motor shaft 5 with a series of angular end cam teeth 25, as one part of a coupling drive. Longitudinally slidably splined on the output shaft 11 is a collar 26, on whose inboard end are arranged a series of teeth of the type known as "king's crown" teeth 27, each of which has a ramp portion 28 and a straight edge portion 29, shown to be intermeshed in Figure 1, as the other part of a coupling drive. These opposing cam teeth are normally held into the meshed position of Figure 1 by a compression coil spring 30 that is positioned between the collar 26 and a shoulder 31 that is rigid with the output shaft 11. The collar 26 has rigidly affixed thereto an external flange 32.

The means for energizing the electromagnet 20, which is shown to be de-energized in Figure 1, includes a micro switch 32 that is adjustably mounted in housing 1 by means of a screw bolt 33. The micro switch may include a slidable plunger 34 mounted in such a manner that pressure upon the plunger to the left will effect a closing of the micro switch. The means for closing the micro switch may constitute a tripping lever 35 that is pivotally secured at 36 to a bracket 37 that is rigid with the motor housing 1.

The "king's crown" cam coupling element 29 is spring loaded by compression coil spring 30 to some predetermined force that requires that the rotor shaft 5 will have to generate a predetermined torque in order to drive the "king's crown" cam 29 axially away from the rotor on the inclined ramps 28. This causes axial movement of the collar 26 and its flange 32 to move the arm 35 counterclockwise about its pivot 36 to depress the micro switch plunger 34 to trigger the micro switch into closed position. The motor cam 25 will rotate as the motor torque is increased. However, the "king's crown" cam 27 will be prevented from rotating due to the fact that the brake assembly is locking the output shaft 11 against rotation. Until the brake assembly is released from the output shaft 11 the "king's crown" cam 27 can move only in an axial direction to the right. After this predetermined torque has been applied and the micro switch 32 has been closed, which, in turn, has energized the brake magnet 20, the armature 21 is drawn by the electromagnet to the left, closing the clearance 23 of Figure 1 into the position shown in Figure 2. This energization of the brake magnet has thus drawn the armature 21 against the action of the compression coil spring 22 to release the braking effect of the brake assembly on the output shaft 11.

Figure 2:
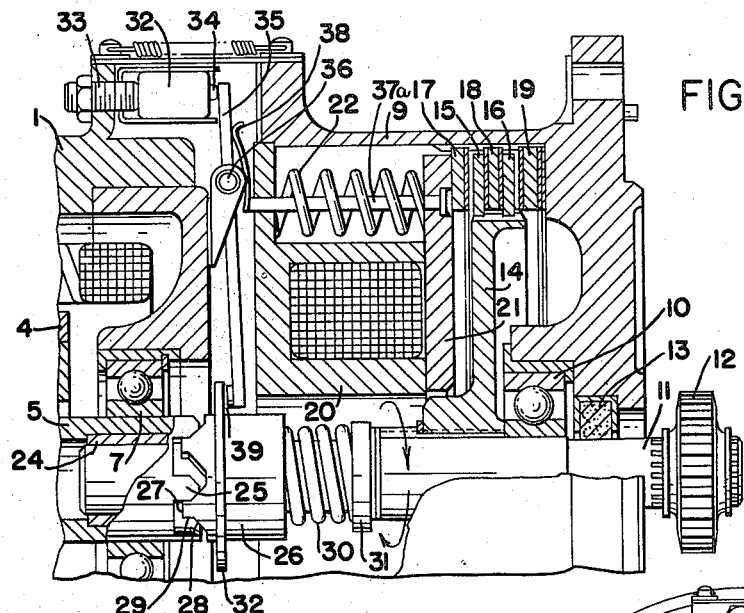
Figure 2 is a partial view similar to Figure 1, showing the micro switch operated to be closed, the electromagnet to have released the brake, the coupling to have shifted to effect a rotary drive of the output shaft by the motor shaft and a spring means for maintaining the micro switch closed as long as the shaft drive continues.
Figure 3:
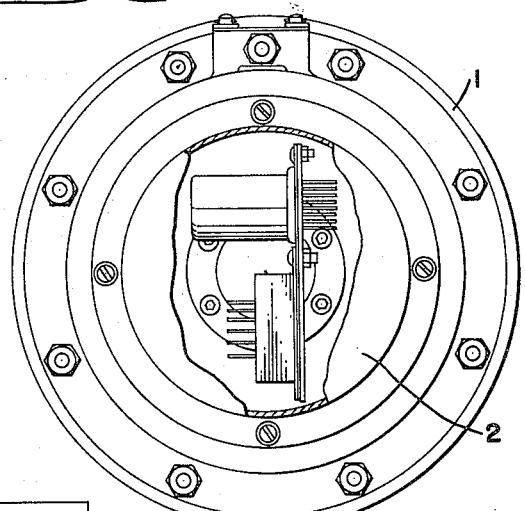
Figure 3 is a view in end elevation, partly broken away, of the motor end of the assembly.

Rigidly secured to and through the armature and extending through the opposite end of the electromagnet is an axially extending pin 37a whose inboard end carries a light leaf spring 38 shown to bear upon the right side of the upper portion of tripping lever 35 to hold the latter in light engagement with the micro switch plunger 34. Thus, as shown in Figure 2, the magnet armature 21, in its axial movement, presses pin 37 and its spring 38 against the torque switch triggering arm 35, which releases the arm 35 from the flange 32 on the collar 26 and allows a clearance therebetween as shown at 39 in Figure 2, so as to eliminate undue and excessive wear.

Moreover, as previously stated, the effect of the pin 37 and its light spring 38 bearing on the triggering arm 35 prevents the micro switch 32 from opening as long as the electromagnet 20 remains energized. This allows variable torque to be driven by the motor after the component parts have assumed the position of Figure 2 in which the cam teeth 25 of the motor shaft 5 are riding on the flat portions 29 of the "king's crown" cam 27, and driving relationship between the two shafts has been effected, without having the brake operate even though the variable load may have dropped below the predetermined value necessary to initially release the braking mechanism.

Figure 4:
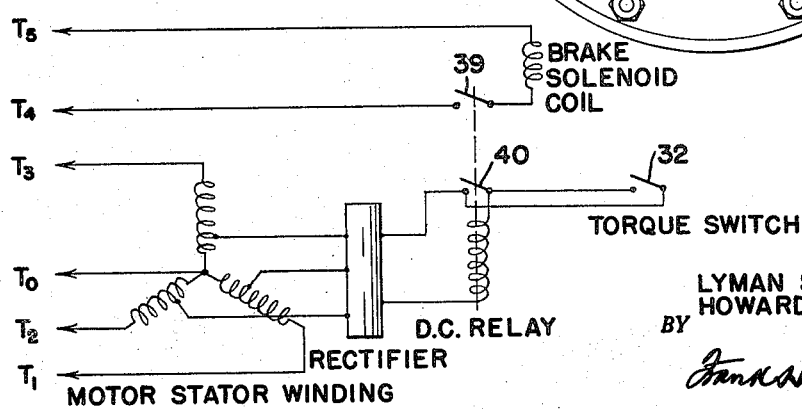
Figure 4 is an electric circuit diagram.

In Figures 1 and 4 we have indicated electrical leads labeled $T_0$, $T_1$, $T_2$, $T_3$, $T_4$ and $T_5$, leading into the housing 1, as shown in Figure 1, the circuit diagram being shown in Figure 4, to include the torque switch, the brake solenoid coil, the motor stator winding, the rectifier and the direct current relay. In Figure 4 the torque starting switch, which is the micro switch shown in Figure 1 at 32, is shown to be open, and correspondingly the two switches 39 and 40 are also shown to be open. The closing of the micro switch 32 by the trigger arm 35 depressing the switch plunger 34 will also automatically cause the closing of switches 39 and 40 to close the circuit shown in Figure 4 to energize the electromagnet 20 and draw the armature 21 to the left to release the brake from the output shaft 11.

It will be noted that with this circuit, whenever the motor stator is energized, current will be supplied to the rectifier and direct current will be supplied to the coil of the relay and to the switches 40 and 32. However, the coil of the relay cannot be energized until the torque switch 32 or microswitch 32 is closed, which then closes the switch 40 and the switch 39 that energizes the electromagnet 20 and releases the brake. Closing of the switch 40 closes a holding circuit for the coil of the D.C. relay so that even if the microswitch 32 should open because of the absence of a load on the motor, the electromagnet 20 will remain energized until the motor is de-energized, which will de-energize the coil of the D.C. relay and permit the contacts 39 and 40 to open. Thus, the electrical circuit is such that the electromagnet 20 for releasing the brake cannot be energized until a sufficient torque has been developed to close the switch 32; but after the switch 32 has once been closed, the electromagnet will remain energized until the power supplied to the motor is cut off. However, whenever the motor is de-energized, the switch 39 will be opened and the brake magnet de-energized even though the torque switch 32 may be closed because of the torque applied or because of the action of the leaf spring 38.

We claim:

1. In combination, an electric motor and a rotary motor shaft driven thereby when said motor is energized, a rotary output shaft adapted for connection to a variable load for driving the latter, a housing for said output shaft, a motor shaft coupling member, a sleeve internally splined to be slidable longitudinally on said output shaft, a sleeve coupling member, means for normally engaging said sleeve coupling member with said motor shaft coupling member, an output shaft brake assembly including a brake element splined on to said output shaft and a brake element splined to said housing, an electromagnet including an armature secured to one of said brake elements and means for normally forcing said armature axially to cause said brake elements to engage each other to effectively brake said output shaft as long as said electromagnet remains deenergized, a normally open switch adapted when closed to energize said electromagnet, a switch tripping arm secured to said housing and adapted to engage said switch, and upon pressure, to close the same, means carried by said sleeve and adapted to engage said switch tripping arm, said motor shaft coupling member, upon energization of said motor, and upon a predetermined value of load on said output shaft, being adapted to move said sleeve coupling member axially to move said switch tripping arm to close said switch to energize said electromagnet to withdraw said armature to release said brake elements when the torque of said motor shaft has reached a predetermined value, and means actuated by said armature adapted to rest against said switch with only sufficient pressure to maintain said switch closed after it has been initially closed when the motor shaft has developed a predetermined torque with relationship to the value of the load on said output shaft.

2. In combination, an electric motor and a rotary motor shaft driven thereby when said motor is energized, a rotary output shaft adapted for connection to a variable load for driving the latter, a housing for said output shaft, a motor shaft coupling member comprising an end cam toothed element rigid with the output end of said motor shaft, a sleeve internally splined to be slidable longitudinally on said output shaft, a sleeve coupling member comprising an end cam toothed element rigid with the input end of said sleeve, a compression coil spring surrounding said output shaft and bearing on said sleeve to normally engage said sleeve coupling member with said motor shaft coupling member, an output shaft brake assembly including a brake arm splined on to said output shaft and a plurality of brake discs alternately splined to said housing and to said brake arm, an electromagnet including an armature and means for normally forcing said armature axially to compress said brake disc assembly to effectively brake said output shaft as long as said electromagnet remains deenergized, a normally open switch adapted when closed to energize said electromagnet, a switch tripping arm secured to said housing and one end of which is adapted to engage said switch, and upon pressure, to close the same, an external flange carried by said sleeve and adapted to engage said switch tripping arm, said motor shaft coupling member, upon energization of said motor, and upon a predetermined value of load on said output shaft, being adapted to extend said sleeve coupling member axially to move said switch tripping arm to close said micro switch to energize said electromagnet to withdraw said armature to release the compression of said brake discs when the torque of said motor shaft has reached a predetermined value, and means actuated by said armature adapted to rest against said switch with only sufficient pressure to maintain said switch closed after it has been initially closed when the motor shaft has developed a predetermined torque with relationship to the value of the load on said output shaft.

3. In combination, an electric motor and a rotary motor shaft driven thereby when said motor is energized, a rotary output shaft adapted for connection to a variable load for driving the latter, a housing, a motor shaft coupling member, an output shaft coupling member, means for urging one of said coupling members toward the other, an output shaft brake assembly including a brake element driven by said output shaft and a brake element held against rotation by said housing, an electromagnet including an armature secured to one of said brake elements, spring means for causing said brake elements to engage each other to brake said output shaft as long as said electromagnet remains de-energized, a normally open switch adapted when closed to energize said electromagnet, one of said coupling members, upon energization of said motor, and upon a predetermined value of load on said output shaft, being adapted to move axially to close said switch to energize said electromagnet to actuate said armature to release said brake elements against the action of said spring means when the torque of said motor shaft has reached a predetermined value.

4. In combination, an electric motor and a rotary motor shaft driven thereby when said motor is energized, a rotary output shaft adapted for connection to a variable load for driving the latter, a housing, a motor shaft coupling member, an output shaft coupling member, means for urging one of said coupling members toward the other, an output shaft brake assembly including a brake element driven by said output shaft and a brake element held against rotation by said housing, an electromagnet including an armature secured to one of said brake elements, spring means for causing said brake elements to engage each other to brake said output shaft as long as said electromagnet remains de-energized, a normally open switch adapted when closed to energize said electromagnet, one of said coupling members, upon energization of said motor, and upon a predetermined value of load on said output shaft, being adapted to move to close said switch to energize said electromagnet to actuate said armature to release said brake elements against the action of said spring means when the torque of said motor shaft has reached a predetermined value, and electric circuit means for maintaining said electromagnet energized so long as the motor remains energized regardless of whether said switch is open or closed.

5. In combination, an electric motor and a rotary motor shaft driven thereby when said motor is energized, a rotary output shaft adapted for connection to a variable load for driving the latter, a housing, a motor shaft coupling member, an output shaft coupling member, an output shaft brake assembly including a brake element driven by said output shaft and a brake element held against rotation by said housing, spring means for causing said brake elements to engage each other to brake said output shaft, an electromagnet adapted when energized to release said brake elements from each other, a normally open switch adapted when closed to energize said electromagnet, one of said coupling members, upon energization of said motor, and upon a predetermined value of load on said output shaft, being adapted to move to close said switch to energize said electromagnet to release said brake elements against the action of said spring means when the torque of said motor shaft has reached a predetermined value, and electric circiut means for maintaining said electromagnet energized so long as the motor remains energized regardless of whether said switch is open or closed.

6. In combination, an electric motor and a rotary motor shaft driven thereby when said motor is energized, a rotary output shaft adapted for connection to a variable load for driving the latter, a housing, a motor shaft coupling member, an output shaft coupling member, said coupling members having normally intermeshed teeth having ramp portions whereby relative rotational movement between said coupling members causes one of said coupling members to move axially away from the other of said coupling members, means for urging one of said coupling members toward the other coupling member, an output shaft brake assembly including a brake element driven by said output shaft and a brake element secured against rotation to said housing, an electromagnet including an armature secured to one of said brake elements, spring means for causing said brake elements to engage each other to brake said output shaft as long as said electromagnet remains de-energized, a normally open switch adapted when closed to energize said electromagnet, one of said coupling members, upon energization of said motor, and upon a predetermined value of load on said output shaft, being adapted to move axially to close said switch to energize said electromagnet to actuate said armature to release said brake elements against the action of said spring means when the torque of said motor shaft has reached a predetermined value.

7. In combination, an electric motor and a rotary motor shaft driven thereby when said motor is energized, a rotary output shaft adapted for connection to a variable load for driving the latter, a housing, a motor shaft coupling member, an output shaft coupling member, said coupling members having normally intermeshed teeth having ramp portions whereby relative rotational movement between said coupling members causes one of said clutch members to move axially away from the other of said coupling members, said teeth on said coupling members also having straight portions adapted to limited relative rotation between said members, means for urging one of said coupling members toward the other clutch member, an output shaft brake assembly including a brake element driven by said output shaft and a brake element secured against rotation to said housing, an electromagnet including an armature secured to one of said brake elements, spring means for causing said brake elements to engage each other to brake said output shaft as long as said electromagnet remains de-energized, a normally open switch adapted when closed to energize said electromagnet, one of said coupling members, upon energization of said motor, and upon a predetermined value of load on said output shaft, being adapted to move axially to close said switch to energize said electromagnet to actuate said armature to release said brake elements against the action of said spring means when the torque of said motor shaft has reached a predetermined value.

References Cited in the file of this patent

UNITED STATES PATENTS

| | | |
|---|---|---|
| 2,214,807 | Buckley | Sept. 17, 1940 |
| 2,411,101 | Millins | Nov. 12, 1946 |
| 2,628,321 | Anderson | Feb. 10, 1953 |
| 2,809,309 | Evans | Oct. 8, 1957 |